US006590525B2

United States Patent
Yule et al.

(10) Patent No.: US 6,590,525 B2
(45) Date of Patent: Jul. 8, 2003

(54) GPS RECEIVER AND MOBILE UNIT INCORPORATING THE SAME

(75) Inventors: Andrew T. Yule, East Grinstead (GB); Stephen Townsend, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/790,454

(22) Filed: Feb. 22, 2001

(65) Prior Publication Data

US 2001/0017599 A1 Aug. 30, 2001

(30) Foreign Application Priority Data

Feb. 24, 2000 (GB) .............................................. 0004371

(51) Int. Cl.[7] ................................................ G01S 5/14
(52) U.S. Cl. .............. 342/357.06; 701/213; 342/357.12
(58) Field of Search ...................... 342/357.12, 357.15, 342/385, 386, 357.06; 701/213; 713/324, 330

(56) References Cited

U.S. PATENT DOCUMENTS

| | | | | |
|---|---|---|---|---|
| 5,418,537 A | * | 5/1995 | Bird .......................... | 342/357.1 |
| 5,448,773 A | * | 9/1995 | McBurney et al. ......... | 455/343 |
| 5,781,156 A | | 7/1998 | Krasner ...................... | 342/357 |
| 5,841,396 A | | 11/1998 | Krasner ...................... | 342/357 |
| 5,874,914 A | | 2/1999 | Krasner ...................... | 342/357 |
| 5,949,812 A | * | 9/1999 | Turney et al. .............. | 375/200 |
| 6,078,290 A | * | 6/2000 | McBurney et al. ......... | 342/417 |
| 6,104,340 A | * | 8/2000 | Krasner ...................... | 342/357.1 |
| 6,133,871 A | * | 10/2000 | Krasner ..................... | 342/357.06 |

* cited by examiner

*Primary Examiner*—Gregory C. Issing
(74) *Attorney, Agent, or Firm*—Steven R. Biren

(57) ABSTRACT

GPS receiver (1) is disclosed together a mobile unit especially in the form of a mobile cellular telephone (30) incorporating the same. The GPS receiver (1) comprises a GPS signal antenna (10) for receiving externally transmitted GPS signals; an analogue-to-digital converter (11) coupled to the antenna for sampling the received GPS signals; a memory (12) for storing the GPS signal samples; and a digital GPS signal processor (13, 14) for retrieving pseudo-range information from the GPS signal samples stored in the memory (12). The receiver (1) has a dormant mode of operation in which received GPS signals are sampled and stored in the memory (12) but the signal processor (13, 14) is not operative for retrieving pseudorange information, and an active mode of operation in which the signal processor (13, 14) is operative for retrieving pseudorange information. Also, the receiver (1) is arranged to change from the dormant mode to the active mode in response to a instruction received from external to the receiver (1) and made whilst the receiver (1) is operating in the dormant mode.

22 Claims, 2 Drawing Sheets

GPS RECEIVER AND MOBILE UNIT INCORPORATING THE SAME

This invention relates to a GPS receiver comprising a GPS signal antenna for receiving externally transmitted GPS signals; an analogue-to-digital converter coupled to the antenna for sampling the received GPS signals; a memory for storing the GPS signal samples; and a digital GPS signal processor for retrieving pseudorange information from the GPS signal samples stored in the memory, wherein the receiver has a dormant mode of operation in which received GPS signals are sampled and stored in the memory but the signal processor is not operative for retrieving pseudorange information, and an active mode of operation in which the signal processor is operative for retrieving pseudorange information.

The invention further relates to a mobile unit incorporating such a GPS receiver and, in particular but not exclusively, to a mobile cellular telephone adapted to provide information corresponding to its position to the base station with which it is registered in the event of an emergency call being made.

At present, GPS is most notably associated with the Navigation System with Time and Ranging (NAVSTAR) GPS, an all weather, spaced based navigation system developed and operated by the US Department of Defense, however, the general principles underlying GPS are universal and not merely limited to NAVSTAR. Accordingly, GPS hereafter refers to any global positioning system comprising a plurality of radio transmitters at different locations and a receiver which determines its location based on the time of arrival and/or time difference of arrival of the transmissions of the radio transmitters.

As is well known, a GPS receiver having a digital GPS signal processor may implement a pseudorandom noise (PRN) code tracking loop in which early (E), prompt (P) and late (L) replica codes of satellite PRN codes are continuously generated, and compared to the incoming satellite PRN codes as received by the receiver. Assuming carrier phase lock, a linear code sweep should eventually result in the incoming PRN code being in phase with that of the locally generated replica and therefore, if detected, code acquisition. Once the code is acquired, the pseudorange information may be retrieved and using conventional navigation algorithms, the position of the receiver calculated. Recently, as an alternative to the above early-late correlation method, it has become known to use fast convolution methods and in particular, involving Fast Fourier Transforms (FFTs), in order to acquired the PRN codes. Such convolution methods are particularly suited to where fast PRN code acquisition is required and are further described in U.S. Pat. No. 5,781,156 which is incorporated herein by reference.

Notwithstanding which of the aforementioned techniques is used for code acquisition, the power consumption during signal acquisition and also during the position calculation process can be significant, up to approximately 1 watt. The problem is particularly relevant to handheld, battery powered GPS receivers which by their nature have a limited capacity and similarly to mobile telephones incorporating such receivers. In addition, with respect to mobile telephones, the problem is further compounded by the fashion for their miniaturisation for both aesthetic and ergonomic reasons.

An important reason for integrating GPS functionality in a mobile cellular telephone is that it has been proposed as a means to enable operators of cellular telephone networks to determine the location from which a call is made and, in particular, for an emergency call to the emergency services. Indeed, in the US, the Federal Communications Commission (FCC) has become the first regulatory authority to require operators to be able to do so. In the case of an emergency call, it is desirable for the positional information to be available as soon as possible, however, from a "cold start" where the GPS receiver does not have access to up to date ephemeris data or even worse from a "factory cold start" where the GPS receiver does not have an up to date almanac, the time to first fix (TTFF) can be anywhere between 30 seconds and 5 minutes. Of course, the problems of cold starts can be eliminated if the GPS receiver is operative to provide a position fix continuously but this is undesirable for the aforementioned reasons relating to power consumption. Also, a user may simply wish to turn their telephone off yet may later wish to make an emergency call immediately after power up.

It is therefore an object of the present invention to provide a GPS receiver capable of the prompt and power efficient retrieval of pseudorange information from received GPS signals.

It is a further object of the invention to provide a mobile unit such as a mobile cellular telephone incorporating the same.

According to a first aspect of the present invention, a GPS receiver of the type described above is provided characterised in that the receiver (30) is arranged to change from the dormant mode to the active mode in response to a instruction received from external to the receiver (30) and made whilst the receiver (30) is operating in the dormant mode.

Such a GPS receiver, upon receiving an appropriate instruction, is able to immediately commence processing the signal samples stored in the memory in order to retrieve the pseudorange information and determining its current position. Furthermore, as receiving, sampling and storing the externally transmitted GPS signals are low power processes relative to the operation of the signal processor for retrieving pseudorange information, the overall power consumption of the GPS receiver remains relatively low.

To ensure that the most up to date GPS signal samples are stored in the memory, in the dormant mode, the received GPS signals may be sampled and stored in the memory continuously.

Alternatively, in the dormant mode, the received GPS signals may be sampled and stored in the memory periodically. This reduces the power consumption of the receiver whilst still enabling the processing of the stored signal samples to commence immediately in order to retrieve pseudorange information.

During use, there is no guarantee that the latest set of GPS signal samples stored in the memory will contain the necessary pseudorange information in order to calculate the position of the receiver. It may be that at the time the last sample set was taken, the GPS signals were received under circumstances of poor signal reception and for that there were insufficient GPS satellites in view from which to retrieve the necessary pseudoranges. For example, when caused by the GPS receiver being surrounded by tall buildings or foliage.

To mitigate the effects of this problem when the received GPS signals are sampled and stored in the memory periodically, the memory store may contain at least two separate sets of GPS signal samples, one separated in time from another. By doing so, it is more likely that at least one sets of samples will be of sufficiently strong GPS signals with a sufficient number of satellites in view. In short, the likelihood of retrieving pseudorange information without having to resample the GPS signals is increased.

In addition, by taking signal samples at different times, it is possible to double-check the determined position and also, if the signal samples are time-stamped, to identify and measure movement of the GPS receiver.

Operation in the dormant mode may be commenced in response to power up of the GPS receiver or, if the receiver comprises a user interface, in response to an instruction received from a user via the user interface.

Also, where the GPS receiver comprises a user interface and is already operating in the dormant mode, the change from the dormant mode to the active mode may be in response to an instruction received from a user via the user interface. This would enable the user to retrieve pseudorange information only when desired.

According to a second aspect of the present invention, a mobile unit is provided comprising a transmitter and a receiver adapted for two-way communication with a base station, and a GPS receiver according to the first aspect of the present invention.

The mobile unit may be arranged to change from the dormant mode to the active mode in response to an instruction received by the mobile unit from a base station. Also, the mobile unit may be further arranged to transmit positional information from the mobile unit to the base station.

In additional, the mobile unit may be a mobile cellular telephone for use with a cellular radio transmission system in the form of a plurality of base stations adapted for two-way radio communication and situated at respective geographical locations to define a corresponding plurality of overlapping service areas constituting one or more regions.

Such a mobile telephone would enable operators of cellular telephone networks to promptly determine the location of a mobile unit from which a call is made. NB. positional information includes not only direct expressions of the position of the mobile unit but also information from which this could be derived, for example, pseudorange information.

Furthermore, by sampling the GPS signal prior to activation of the active mode, say in response to an emergency call, the risk of signal interference and drowning of the GPS signal is reduced. Such signal interference and drowning may be caused by the mobile unit's transmitter transmitting encoded voice or other data to a base station and perhaps also the mobile unit's receiver receiving base station replies.

Operation in the dormant mode may commence upon the mobile telephone's recognition of an emergency call being made and then to change to active mode in the event of a request being made by the emergency services operator. This would reduce power consumption whilst ensuring the sampled data was still available when required.

Alternatively, when operating in the dormant mode, to change from the dormant mode to the active mode may occur in response to recognition by the mobile telephone of an emergency call being made. This would enable the positional information to be available more quickly, possibly even in advance of connection of the mobile cellular telephone to the emergency services operator.

Recognition by the mobile telephone of an emergency call being made may include recognising when a user enters the first one or more digits of the emergency call telephone number, for example, by typing on a keypad or alternatively using speech recognition.

Operation of the dormant mode may also be in response to a change in the strength of the signals received from a base station of a cellular radio transmission system, e.g. indicative of the mobile telephone being removed from a pocket or briefcase; in response to detected movement of the mobile telephone, e.g. when detected by an accelerometer located in the mobile telephone; or in response to the retracting of a cover on the mobile telephone, e.g. in the case of a mobile telephone with a sliding cover protecting the key pad, by retracting the cover, or in the case of a "flip top" mobile telephone, by flipping the cover.

According to a third aspect of the present invention, a method of operating a GPS receiver of the type described above is provided comprising the steps of (i) in a dormant mode of operation, sampling and storing received GPS signals in the memory whilst the signal processor for retrieving pseudorange information is not operative; and (ii) in response to a instruction received from external to the GPS receiver, changing from the dormant mode to an active mode of operation in which the signal processor for retrieving pseudorange information becomes operative.

In the dormant mode, the received GPS signals may be sampled and stored in the memory continuously or alternatively periodically. Where they are stored periodically, the memory store may contain at least two separate sets of GPS signal samples, one separated in time from another. Also, where the GPS receiver further comprises a user interface, the transition from the dormant mode to the active mode may occur in response to an instruction received from a user via the user interface.

These and other aspects of the invention will be apparent from and elucidated with reference to the embodiments described hereinafter, by way of example, with reference to the accompanying drawings in which.

In the drawings, corresponding features in different embodiments have been identified using the same reference numerals.

Figure 1:
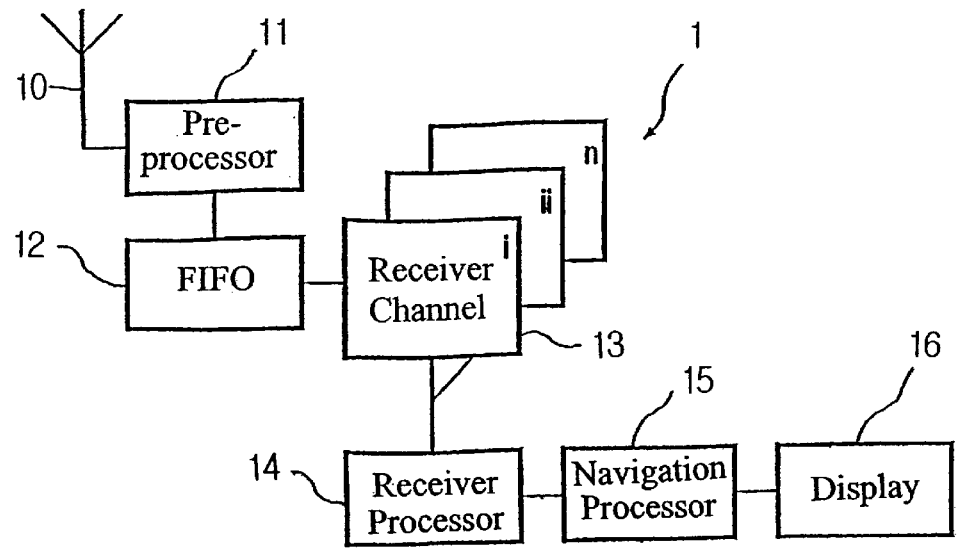
FIG. 1 shows, schematically, a GPS receiver according to the present invention.

FIG. 1 shows, schematically, the architecture of a GPS receiver 1 according to the present invention. NAVSTAR SPS GPS signals are received by an antenna 10 and pre-processed in a pre-processor 11; typically by passive band-pass filtering in order to minimise out-of-band RF interference, preamplification, down conversion to an intermediate frequency (IF) and analog to digital conversion. The resultant, digitised IF signal remains modulated, still containing all the information from the available satellites, and is fed into a first in-first out (FIFO) memory 12. From the memory, the samples may be fed at any time later into each of a series of parallel receiver channels 13. The satellite signals are acquired and tracked in respective digital receiver channels in co-operation with the receiver processor 14 for the purpose of acquiring pseudorange information. Such methods for acquisition and tracking are well known, for example, see chapter 4 (GPS satellite signal characteristics) & chapter 5 (GPS satellite signal acquisition and tracking) of GPS Principles and Applications (Editor, Kaplan) ISBN 0-89006-793-7 Artech House. Using acquired pseudorange information and the time of arrival of the transmissions, the navigation processor 15 calculates the position of the receiver using conventional algorithms and that position is displayed on a display 16 to the user.

Figure 2:
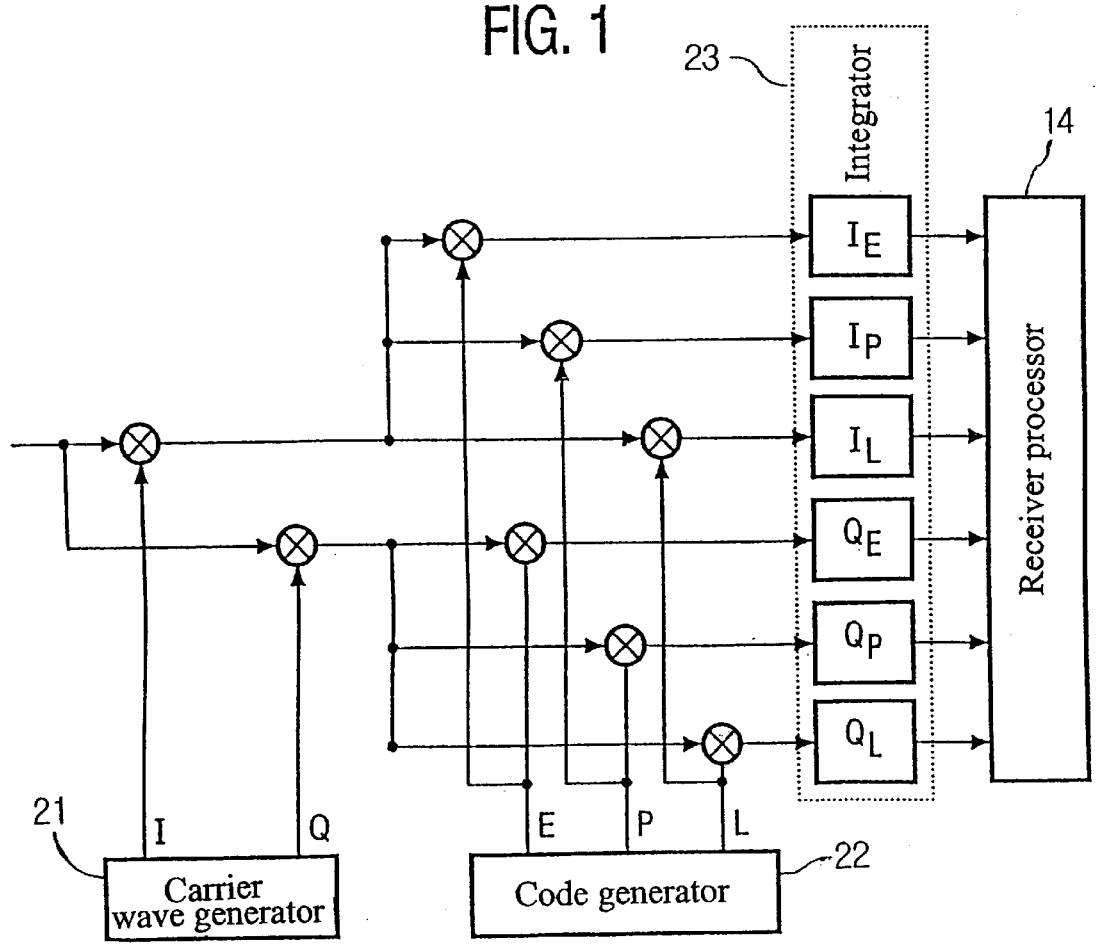
FIG. 2 shows, schematically, the receiver channels and receiver processor of the GPS receiver of FIG. 1 in greater detail.

FIG. 2 shows, schematically, the receiver channel co-operating with the receiver processor in greater detail. In order to retrieve pseudorange information from the signal samples stored in the memory 12, a carrier wave must be removed and this is done by the receiver generating in-phase (I) and quadrature phase (Q) replica carrier wave signals using a carrier wave generator 21. A carrier wave phase lock loop (PLL) is normally employed to accurately replicate the frequency of the received carrier wave. In order to acquire code phase lock, early (E), prompt (P) and late (L) replica codes of the PRN sequences are continuously generated by a code generator 22. The replica codes are then correlated with the I and Q signals to produce three in-phase correlation components ($I_E$, $I_L$, $I_P$) and three quadrature phase correlation components ($Q_E$, $Q_L$, $Q_P$), typically by integration in an integrator 23 over substantially the whole of the PRN code. In the receiver processor 14, a code phase discriminator is calculated as a function of the correlation components and a threshold test applied to the code phase discriminator. A phase match is declared if the code phase discriminator is high and if not, the code generator produces the next series of replicas with a phase shift. A linear phase sweep will eventually result in the incoming PRN code being in phase with that of the locally generated replica and thus code acquisition.

The pre-processor 11 will be typically implemented in the form of front end analogue circuitry with the digital receiver channels 13, the receiver processor 14 and the navigation processor 15 implemented in the form of a general purpose microprocessor or a microprocessor embedded in a GPS application specific integrated circuit (ASIC).

In one example, downconversion of received L1 C/A GPS signals is from the carrier broadcast frequency of 1575.42 MHz to an IF in the region of 5 MHz. The IF signal is sampled at a rate of 25 MHz with 4-bit quantisation and stored in an 8 Megabyte FIFO memory 12. This makes it possible to store samples of 0.64 seconds worth of GPS signal, which equates to approximately 640 L1 C/A Gold code repetitions. This is normally sufficient to acquire the GPS signals in even poor conditions. In good reception conditions, a smaller memory for storing samples from a smaller snapshot of GPS signal sample would be sufficient and, conversely, a larger memory may enable weaker code signals to be acquired. A lower IF, sampling rate and level of quantisation may enable the memory to be used more efficiently, however, inevitably at the expense of the quality of the subsequent correlation.

The GPS receiver 1 has two modes of operation. First, a dormant mode of operation which is effected automatically upon power up and in which every five seconds, a 0.64 second GPS signal extract is received, pre-processed, sampled and stored in the memory 12. In the dormant mode, the digital receiver channels 13, the receiver processor 14 and the navigation processor 15 are powered down, i.e. no baseband processing is performed. Secondly, the GPS receiver has an active mode of operation in which the pre-processing, sampling and sample storage in the memory 12 store of GPS signals is suspended and samples stored in the memory processed in the digital receiver channels 13 and receiver processor 14 in order to retrieve pseudorange information. Upon retrieval of the pseudorange information, the navigation processor 15 calculates the position of the receiver which is displayed to the user on a display 16. A user is able to effect the transition from dormant mode to active mode for the purpose of displaying the current position by pressing a button on a keypad (not shown) of the GPS receiver.

As previously stated, the pre-processing, receiver channel and receiver processor will be typically implemented in the form of front end analogue circuitry combined with either a general purpose microprocessor or a microprocessor embedded in a GPS application specific integrated circuit. Implementation of a method of GPS receiver operation according to the present invention, including the example as described below, may be accomplished by appropriate analogue circuitry design and/or microprocessor programming. Of course, such design and programming is well known and would be accomplished by one of ordinary skill in the art of GPS and CDMA communication without undue burden.

Figure 3:
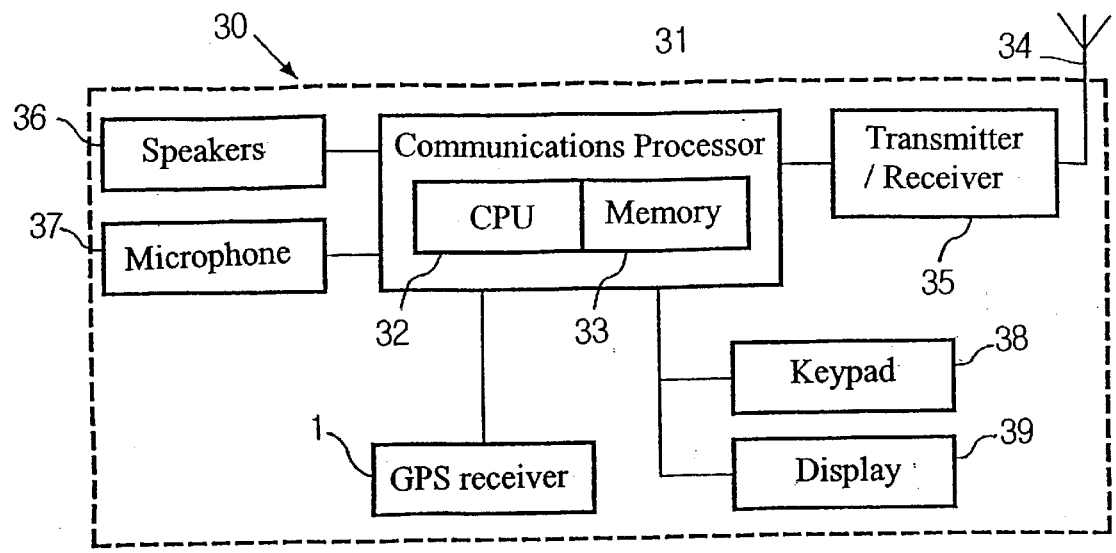
FIG. 3 shows a "flip-top" mobile cellular telephone incorporating the GPS receiver of FIG. 1.

A "flip-top" mobile cellular telephone 30 according to the present invention is shown schematically in FIG. 3. The telephone comprises a communication processor 31 having a central processing unit 32 and memory 33. The communication processor is coupled to an antenna 34 via a transmitter/receiver 35, to speakers 36 of which one is for use with the telephone ear piece and the other for user notification, to a microphone 37, to a keypad 38, to a display 39. The mobile cellular telephone is powered by a battery (not shown) and further incorporates a GPS receiver 1 of the type shown in FIG. 1.

Figure 4:
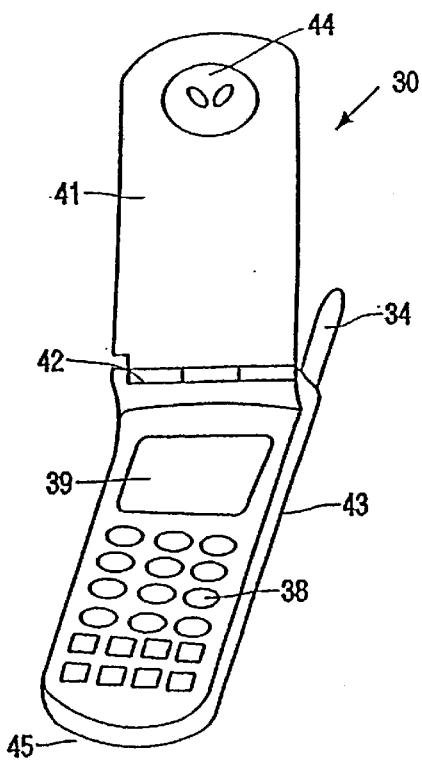
FIG. 4 shows, schematically, the workings of the mobile cellular telephone of FIG. 3.

The "flip-top" telephone 30 is shown pictorially in FIG. 4. A flip cover 41 is attached by a hinge 42 to the body 43 of the mobile telephone on which is further mounted the keypad 38 and the display 39. Also visible on the outside of the telephone is the antenna 37 and perforations in both the flip cover 44 and body 45 of the mobile telephone which allow passage of sound waves from the ear piece speaker located within the flip cover 36 and to the microphone 37 located within the body of the mobile phone respectively.

The mobile cellular telephone 30 is suitable for use with a cellular radio transmission system (not shown) in the form of a plurality of base stations adapted for two-way radio communication and situated at respective geographical locations to define a corresponding plurality of overlapping service areas constituting one or more regions. Of course, such cellular radio transmission systems and their signalling protocols are well known and will not be elaborated upon here further.

When the mobile telephone is powered up, the GPS receiver 1 of the mobile cellular telephone 30 operates in dormant mode, periodically sampling GPS signals. This remains the case until a user makes an emergency call to an emergency service operator (the US version being a 911 public safety answer point, PSAP). From the emergency service operator, an automated request is sent to the mobile cellular telephone for information relating to its position and upon receiving the request, the GPS receiver 1 changes from dormant mode to active mode whereby the position of the GPS receiver is determined. This position is provided to the communication processor 31 and transmitted to the operator via the base station of the cellular radio transmission system with which the mobile cellular telephone is registered (not shown) and thereafter the appropriate emergency service. Alternatively, pseudorange information may be provided to the base station and the position derived from this, remote from the mobile cellular telephone.

In the above example, the transition from dormant to active mode is made in response to a request from the base station. Alternatively, by the user entering the number for the emergency services ("999" in the UK, "911" in the US), the mobile telephone may itself recognise an emergency call is being made, perhaps from the first few digits of the appropriate telephone number, and effect the transition from dormant to active mode accordingly.

Also, as an alternative to commencement of operation in the dormant mode upon power up, commencement may be in response to flipping the flip cover, indicative of the phone being prepared for use.

U.S. Pat. No. 5,841,396 discloses a GPS receiver of the conventional type to which the invention relates. It describes a mobile unit comprising a GPS antenna for receiving GPS signals, an RF to IF converter for down-converting the received GPS signals to an IF, an analogue to digital converter for digitising the IF signals, a "digital snapshot memory" for storing the digitised samples and a digital signal processing (DSP) microprocessor for processing the digitised samples in order to determine the position of the mobile unit. At lines 49 to 64 of column 6, it states that upon receiving a command, the RF to IF converter, analogue to digital converter and "digital snapshot memory" are activated in order to store a set of data in the memory corresponding to between 100 ms and 1 s of GPS signal. It further states from lines 11 to 22 of column 7 that this is done whilst keeping the DSP microprocessor in a low power state and then the DSP microprocessor is activated to process the signals during which time the RF to IF converter and analogue to digital converter may be powered down in order to minimise power consumption. The present invention distinguishes over this mobile unit in that its RF to IF converter, analogue to digital converter and "digital snapshot memory" are activated upon receiving a command such as from a base station, and that the DSP microprocessor is merely activated sequentially thereafter. Activation of the DSP is not in response to an instruction received whilst the RF to IF converter, analogue to digital converter and "digital snapshot memory" are activated.

At the time of writing, the applicant is not aware of the FCC having prescribed a maximum time limit in which to obtain a location fix, but it is believed the general consensus amongst mobile telephone vendors and the 911 PSAP is that it will be set at about five seconds.

One way in which this can be achieved is using base station assistance. Such assistance includes the provision by the base station to the receiver of a precision carrier frequency reference signal for calibrating the local oscillator used in the GPS receiver and also up to date satellite almanac and ephemeris data in order to calculate the approximate frequency shift for satellites in view. This assistance is further described in U.S. Pat. Nos. 5,841,396 and 5,874,914 which are incorporated herein by reference.

Although described with reference to early-minus-late correlation techniques, the invention is equally applicable to convolution methods including involving Fast Fourier Transforms (FFTs). Also, base station assistance is equally applicable to either correlation architecture, i.e. for using both early-minus-late correlation and convolution methods.

From a reading of the present disclosure, other modifications will be apparent to the skilled person skilled and may involve other features which are already known in the design, manufacture and use of GPS receivers and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same problems as does the present invention. The applicants hereby give notice that new claims may be formulated to such features and/or combinations of such features during the prosecution of the present application or of any further application derived therefrom.

What is claimed is:

1. A GPS receiver comprising:
   a GPS signal antenna for receiving externally transmitted GPS signals;
   an analogue-to-digital converter coupled to the antenna for sampling the received GPS signal;
   a memory for storing the GPS signal samples;
   a digital GPS signal processor for processing the GPS signal samples stored in the memory to recover pseudorange information; and
   a controller for controlling the operation of the receiver;
   wherein the receiver has a dormant mode of operation in which received GPS signals are sampled and stored in the memory but the signal processor is not operative for recovering pseudorange information from the GPS signal samples, and an active mode of operation in which the signal processor is operative for recovering pseudorange information from the GPS signal samples, characterized in that the controller is arranged to cause a change from the dormant mode to the active mode in response to an instruction for a GPS position fix received by the receiver whilst the receiver is operating in the dormant mode.

2. A GPS receiver according to claim 1 wherein, in the dormant mode, the received GPS signals are sampled and stored in the memory continuously.

3. A GPS receiver according to claim 1 wherein, in the dormant mode, the received GPS signals are sampled and stored in the memory periodically.

4. A GPS receiver according to claim 2 wherein, in the dormant mode, the memory contains at least two separate sets of GPS signal samples, one separated in time from another.

5. A GPS receiver according to claim 1, arranged to commence operation in the dormant mode in response to power up of the GPS receiver.

6. A GPS receiver according to claim 1, further comprising a user interface, wherein the receiver is arranged to commence operation in the dormant mode in response to an instruction received from a user via the user interface.

7. A GPS receiver according to claim 1, further comprising a user interface, wherein the receiver is arranged to change from the dormant mode to the active mode in response to an instruction received from a user via the user interface.

8. A mobile unit comprising a transmitter and a receiver adapted for two-way communication with a base station, and a GPS receiver according to claim 1.

9. A mobile unit according to claim 8 arranged to change from the dormant mode to the active mode in response to an instruction received by the mobile unit from a base station.

10. A mobile unit according to claim 8 arranged to transmit positional information from the mobile unit to the base station.

11. A mobile unit according to claim 8 in the form of a mobile cellular telephone for use with a cellular radio transmission system in the form of a plurality of base stations adapted for two-way radio communication and situated at respective geographical locations to define a corresponding plurality of overlapping service areas constituting one or more regions.

12. A mobile unit according to claim 11 arranged to commence operation in the dormant mode in response to recognition by the mobile telephone of an emergency call being made.

13. A mobile unit according to claim 11 arranged, when operating in the dormant mode, to change from the dormant mode to the active mode in response to recognition by the mobile telephone of an emergency call being made.

14. A mobile unit according to claim 12, wherein recognition by the mobile telephone of an emergency call being made occurs when a user enters one or more digits of the emergency call telephone number.

15. A mobile unit according to claim 11 arranged to commence operation in the dormant mode in response to a change in the strength of the signals received from a base station of the cellular radio transmission system.

16. A mobile unit according to claim 11 arranged to commence operation in the dormant mode in response to detected movement of the mobile telephone.

17. A mobile unit according to claim 11 further comprising a retractable cover and arranged to commence operation in the dormant mode in response to a user retracting the cover.

18. A method of operating a GPS receiver comprising a GPS signal antenna for receiving externally transmitted GPS signals; an analogue-to-digital converter coupled to the antenna for sampling the received GPS signals; a memory for storing the GPS signal samples; a digital GPS signal processor for processing the GPS signal samples stored in the memory to recover pseudorange information; and a controller for controlling the operation of the receiver, the method comprising the steps of:

(i) in a dormant mode of operation, sampling and storing received GPS signals in the memory whilst the signal processor for recovering pseudorange information from the GPS signal samples is not operative; and (ii) in response to an instruction for a GPS position fix received by the controller whilst the receiver is operating in the dormant mode, the controller causing a change from the dormant mode to an active mode of operation in which the signal processor for retrieving pseudorange information from the GPS signal samples becomes operative.

19. A method according to claim 18 wherein, in the dormant mode, the received GPS signals are sampled and stored in the memory continuously.

20. A method according to claim 19 wherein, in the dormant mode, the received GPS signals are sampled and stored in the memory periodically.

21. A method according to claim 20 wherein, in the dormant mode, the memory store contains at least two separate sets of GPS signal samples, one separated in time from another.

22. A method according to claim 18 wherein the GPS receiver further comprises a user interface; and wherein the transition from the dormant mode to the active mode occurs in response to an instruction received from a user via the user interface.

* * * * *